US005468954A

United States Patent [19]
Furukawa

[11] Patent Number: 5,468,954
[45] Date of Patent: Nov. 21, 1995

[54] PHOTO-ELECTRIC CONVERTER HAVING VARIABLE ACCUMULATION TIME

[75] Inventor: Tatsuo Furukawa, Atsugi, Japan

[73] Assignee: Canon Kabushiki Kaisha, Tokyo, Japan

[21] Appl. No.: 114,066

[22] Filed: Aug. 31, 1993

Related U.S. Application Data

[63] Continuation of Ser. No. 901,170, Jun. 19, 1992, Pat. No. 5,272,328.

[30] Foreign Application Priority Data

Jun. 21, 1991 [JP] Japan ................................. 3-149147

[51] Int. Cl.⁶ .................................................. H01J 40/14
[52] U.S. Cl. ........................................ 250/208.1; 348/297
[58] Field of Search ........................... 250/208.1, 208.3, 250/214 C; 358/213.19, 213.11, 213.28, 213.26, 213.16, 412; 348/297, 257

[56] References Cited

U.S. PATENT DOCUMENTS

| 4,479,062 | 10/1984 | Kawasaki et al. | 358/213.19 |
| 4,701,626 | 10/1987 | Ishizaki et al. | 250/208.3 |
| 4,990,917 | 2/1991 | Kohdaka | 341/159 |
| 5,182,447 | 1/1993 | Nakayama | 250/208.1 |
| 5,272,328 | 12/1993 | Furukawa | 250/208.1 |

FOREIGN PATENT DOCUMENTS

| 0276126 | 1/1988 | European Pat. Off. . |
| 61-167916 | 7/1986 | Japan . |
| 1222583 | 9/1989 | Japan . |
| 1305672 | 12/1989 | Japan . |

Primary Examiner—Edward P. Westin
Assistant Examiner—Que T. Le
Attorney, Agent, or Firm—Fitzpatrick, Cella, Harper & Scinto

[57] ABSTRACT

An image pickup apparatus has a first sensor, and first control circuitry for controlling an accumulation time of said first sensor based on an output signal of said first sensor and a first reference level. Also provided is a second sensor, and second control circuitry for controlling an accumulation time of the second sensor based on an output signal of the second sensor and a second reference level which is different from the first reference level. The second control circuitry also compensates a level difference between a level of the output signal of the first sensor and a level of the output signal of the second sensor.

3 Claims, 5 Drawing Sheets 5,468,954

PHOTO-ELECTRIC CONVERTER HAVING VARIABLE ACCUMULATION TIME

This application is a continuation of application Ser. No. 07/901,170 filed Jun. 19, 1992, now U.S. Pat. No. 5,272,328.

BACKGROUND OF THE INVENTION

1. Field of the Invention

The present invention relates to a photo-electric converter which varies an accumulation time as an illumination of an object changes so that an output voltage in a predetermined range is always produced.

2. Related Background Art

Since the illumination of the object varies in a wide range such as $10^{-3}$ to $10^3$ luxes, a sufficient dynamic range of the output voltage in a prior art photo-electric converter used for AF (auto-focusing) means of a camera cannot be attained by setting a fixed accumulation time. Thus, the accumulation time is varied with the change of the illumination of the object and the output voltage is amplified in accordance with the accumulation time to attain a so-called AGC (auto-gain control) so that an output voltage within a predetermined range is produced without regard to the illumination of the object.

In such a contrast control type photo-electric converter, a control method for detecting the illumination of the object on real-time basis and terminating the accumulation when a predetermined input level is reached is disclosed in Japanese Laid-Open Patent Application No. 61-167916.

In an improvement over the above control method, maximum and minimum values of the illumination are detected on real-time basis, and the accumulation time is changed in accordance with a difference between the maximum and the minimum, that is, a contrast of the object, and the output voltage is amplified in accordance with the contrast, is disclosed in Japanese Laid-Open Patent Application No. 1-222583.

In the disclosed construction, a constant contrast component can always be taken out without regard to the condition of the object so that a control system which is strong to a low contrast can be attained.

FIG. 1 shows a circuit block diagram of a configuration of a photo-electric conversion sensor unit and a control unit of a prior art contrast control type photo-electric converter. Numerals 401–401n denote NPN transistors which function as photo-sensing elements, numerals 402–402n denote switching transistors for resetting base electrodes of the NPN transistors 401–401n, numerals 403–403n denote switching transistors for resetting emitter electrodes of the transistors 401–401n, numerals 404–404n denote capacitors for storing output voltages of the transistors 401–401n, numerals 405–405n denote switching transistors for transferring the outputs of the transistors 401–401n which function as the photo-sensing elements to the capacitors 404–404n for controlling the accumulation time, numerals 406–406n denote switching transistors for reading out the voltages stored in the capacitors 404–404n, numeral 408 denotes a common output line to which the outputs are read, and numeral 409 denotes a stray capacity of the common output line 408.

Numeral 410 denotes a shift register for scanning bits, numeral 411 denotes an output buffer, numeral 412 denotes an amplifier for real-time monitoring a maximum value of the outputs of the photo-sensing transistors, numeral 413 denotes an amplifier for real-time monitoring a minimum value of the outputs of the photo-sensing transistors 401–401n, numeral 414 denotes an output buffer, numeral 415 denotes a differential amplifier, numerals 416, 417 and 418 denote resistors for producing desired voltages, numerals 419, 420 and 421 denote comparators, numeral 422 denotes a control circuit which receives the outputs of the comparators 419, 420 and 422 to drive the switching transistors 405–405n for controlling the accmulation time, numeral 423 denotes a reference voltage terminal for determining a comparison reference voltage of the comparators, numeral 424 denotes a photo-electric conversion sensor output terminal, numeral 425 denotes an accumulation time control pulse output terminal, numeral 426 denotes a sensor collector power supply terminal, numeral 427 denotes a control terminal for the switching transistors 402–402n, numeral 428 denotes a base reset terminal for the switching transistors 402–402n, numeral 429 denotes a control terminal for the switching transistors 403–403n, and numeral 430 denotes an emitter reset power supply terminal for the switching transistors 403–403n.

FIG. 2 shows a timing chart of a photo-sensor reset period and an accumulation time in the prior art configuration.

When pulses are applied to the terminals 425, 427 and 429, the output of the differential amplifier 415 gradually rises on real time basis from the start of accumulation in accordance with the contrast of the object, as shown in FIG. 2. Reference voltages of the comparators 419, 420 and 421 for comparing the outputs are referred to as A, B and C, and the prior art control method is explained below.

FIG. 3 illustrates the control of the output voltage versus the accumulation time for explaining an operation of the prior art photo-electric converter.

The output of the differential amplifier 415 shown in FIG. 1, that is, the output of the real time contrast monitor rises with the accumulation time. A time point $T_B$ is set in the accumulation time period and following five controls are conducted.

① When the output exceeds the level A before the accumulation time $T_B$, the accumulation is terminated at that time point $t_1$.

② When the output exceeds the level B at the time point $T_B$, the accumulation is continued until the output reaches the level A, when the accumulation is terminated at that time point $t_2$.

③ When the output exceeds the level C at the time point $T_B$, the accumulation is continued until the output reaches the level B, when the accumulation is terminated at that time point $t_3$.

④ When the output is below the level C at the time point $T_B$, the accumulation is continued until the output reaches the level C, when the accumulation is terminated at that time point $t_4$.

⑤ When the output does not reach the level C before a preset maximum accumulation time $T_{MAX}$, the accumulation is terminated at the time point $T_{MAX}$.

The output of the photo-electric conversion sensor is multiplied by the gain corresponding to the level A, B or C so that proper AGC is attained and the output in the predetermined range is attained without regard to the contrast of the object.

The outputs of the transistors 401–401n which function as the photo-sensors are temporarily transferred to the accumulation capacitors 404–404n through the transistors 405–405n at the end of accumulation. Then, the shift register 410 is serially scanned to read out the content thereof to the common line 408 through the transistors 406–406n. The output $V_{out}$ in given by $$V_{out} = V_E \cdot C_T/(C_T + C_H)$$

where $C_T$ is the capacitance of the accumulation capacitor 404, $C_H$ is the stray capacitance 409 of the common line 408 and $V_E$ is a voltage at $C_T$.

Main components of $C_H$ are a drain capacitance of the transistor 406, a wiring capacitance of the common line 408 and an input capacitance of the output buffer 411. A gain determined by the level of the comparator is multiplied to $V_{out}$ in a succeeding stage processing circuit.

However, in a recent AF system, a plurality of columns of photo-sensing elements are formed in one chip, different numbers of pixels are used, or different orientations are used in order to enhance the functions.

Where a plurality of sensor columns each including a plurality of photo-sensing elements are arranged and the numbers of pixels of the sensor columns are different from each other, the numbers of reading switching transistors 406 are different from each other in the prior art configuration. As a result, the capacitances $C_H$ of the stray capacitors 409 are different from sensor column to sensor column.

Where the photo-sensing elements are not arranged in one direction, the wiring lengths of the common line 408 are different from sensor column to sensor column. This also causes different values of $C_H$. The fact that the values of $C_H$ are different from sensor column to sensor column means that the output voltages from the respective sensor columns are different. This causes ununiformity in sensitivity.

If the AGC is applied to such a plurality of sensor columns by the same comparator level, the ununiformity in the sensitivity due to the difference in $C_H$ is directly amplified.

SUMMARY OF THE INVENTION

It is an object of the present invention to provide a photo-electric converter which solves the problems encountered in the prior art and which enables to take out output voltages of a plurality of sensor columns having different number of pixels or different wiring lengths.

The above object of the present invention is attained by an embodiment of the photo-electric converter of the present invention which comprises a plurality of sensor columns, reference voltage control means for correcting a difference between the outputs of the sensor columns, and a control block including a plurality of comparators for discriminating output voltages of a plurality of photo-sensing elements of the sensor columns and an accumulation time control circuit connected to the comparators. An accumulation time controlling switching element is driven by the output of the control block to make the output accumulation time be correlated to the output voltage of the photo-sensing element. The reference voltage control means controls comparison reference voltages applied to the comparators of the control blocks so that the respective sensor columns produce outputs of the same level.

In accordance with the present invention, the output voltages of the photo-sensing elements of the sensor columns are discriminated by the comparators of the control block and applied to the accumulation time control circuit, and the output from the accumulation time control circuit drives the accumulation time control switching elements to make the output accumulation time to be correlated to the outputs of the photo-sensing elements. The reference voltage control means also controls the comparison reference voltages applied to the comparators of the control blocks so that the difference between the outputs of the sensor columns is corrected and outputs of the same level are produced from the plurality of sensors.

Other objects and features of the present invention will be apparent from the following description and the accompanying drawings.

DETAILED DESCRIPTION OF THE PREFERRED EMBODIMENTS

Figure 1:
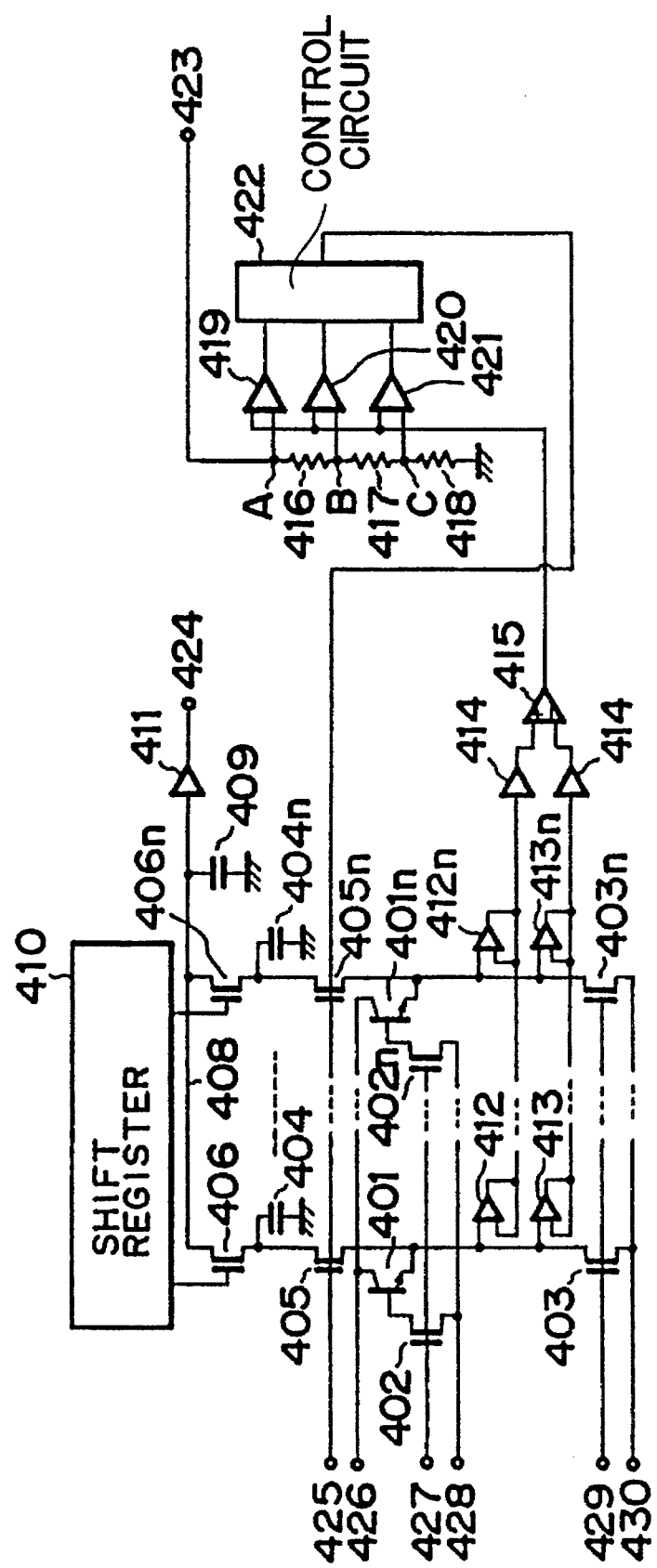
FIG. 1 shows a prior art circuit block diagram.
Figure 2:
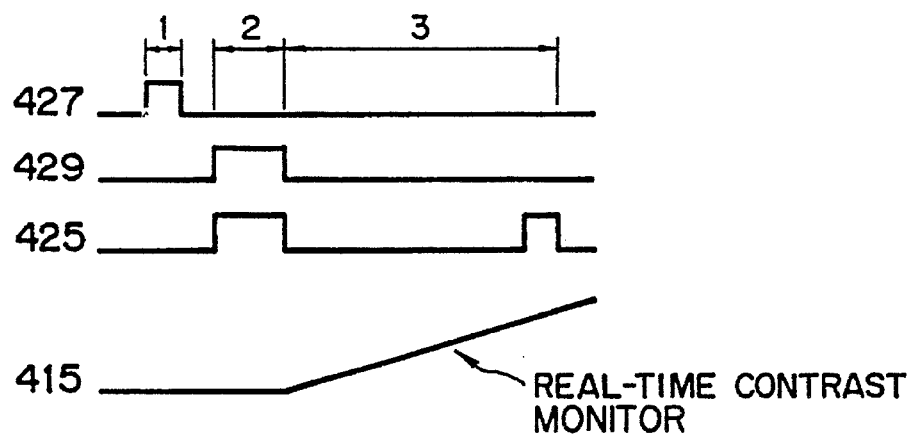
FIG. 2 shows a timing chart in the prior art.
Figure 3:
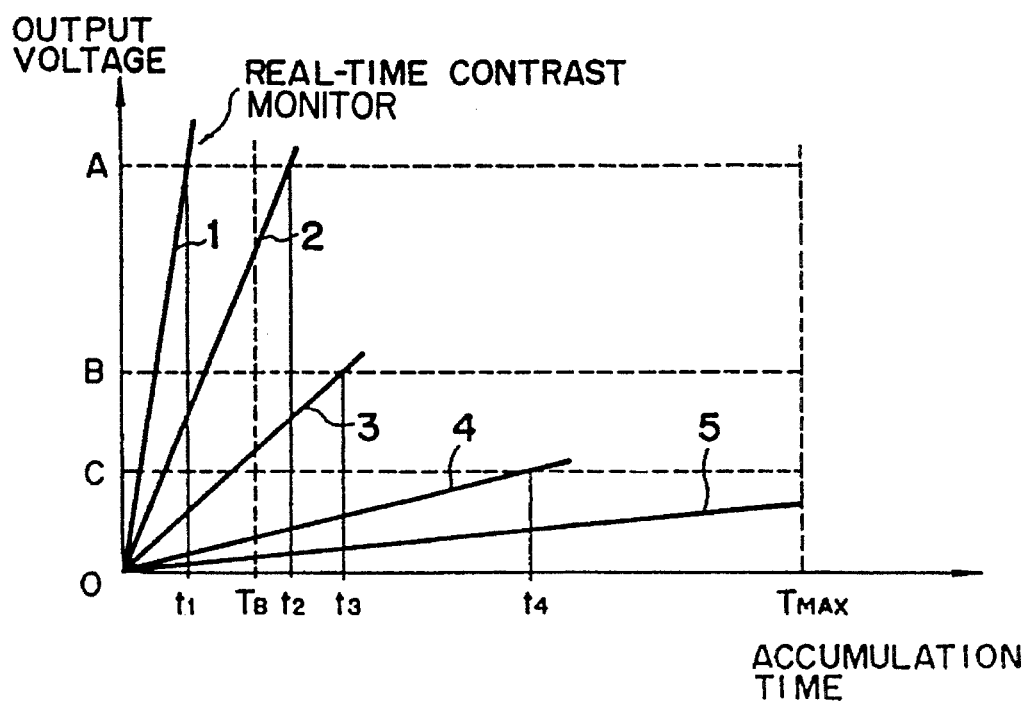
FIG. 3 illustrates control in the prior art.
Figure 4:
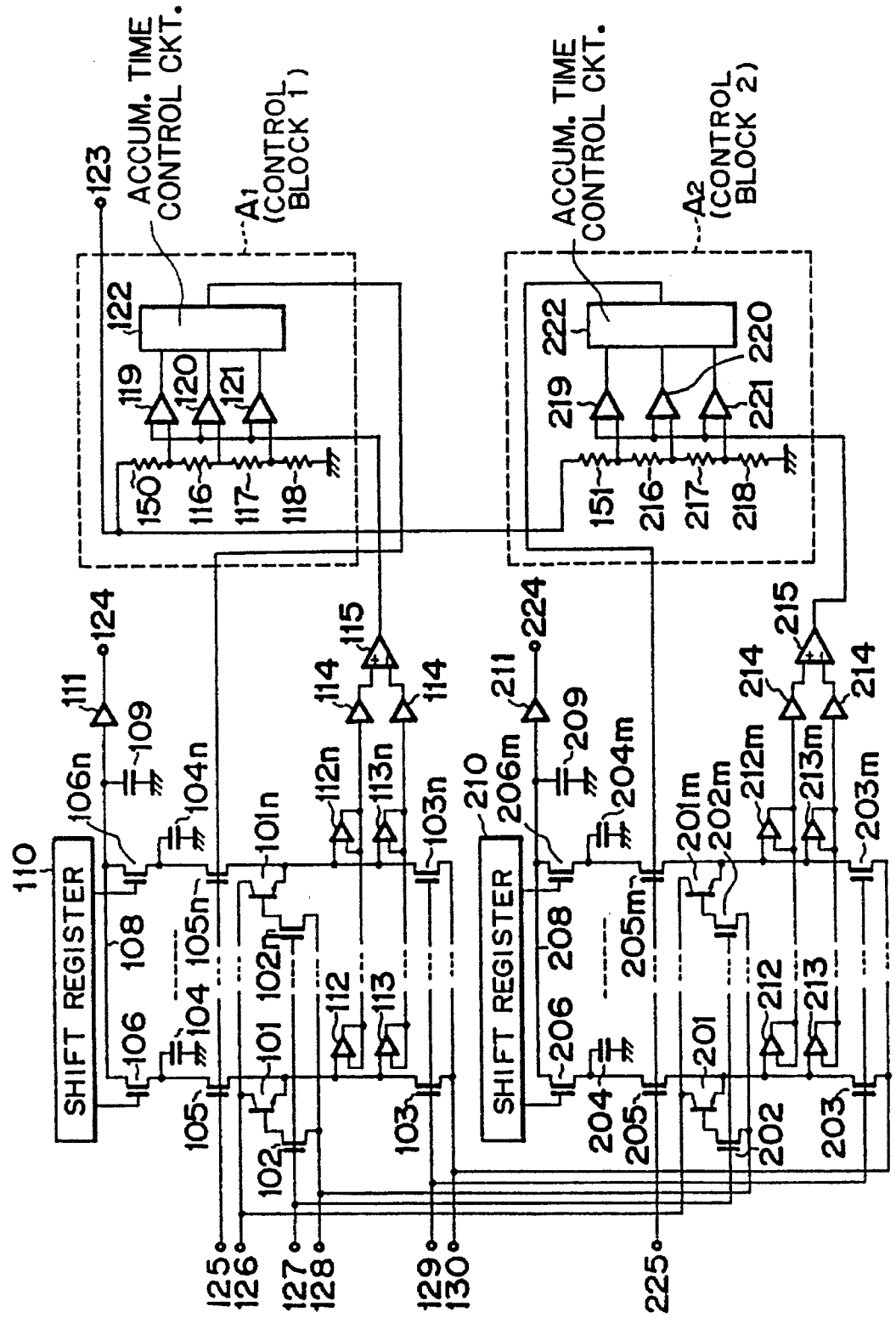
FIG. 4 shows a circuit block diagram of one embodiment of the present invention.

An embodiment of the photo-electric converter of the present invention is now explained. FIG. 4 shows a circuit block diagram of the present embodiment. Numerals 101–101n and 201–201m denote NPN transistors which function as photo-sensing elements, numerals 102–102n and 202–202m denote switching transistors for resetting base electrodes of the photo-sensing transistors, numerals 103–103n and 203–203m denote switching transistors for resetting emitter electrodes of the photo-sensing transistors, numerals 104–104n and 204–204m denote accumulation capacitors for accumulating the output voltages of the photo-sensing transistors, numerals 105–105n and 205–205m denote accumulation time controlling switching transistors for controlling the accumulation times of the accumulation capacitors and transferring the outputs of the photo-sensing elements to the accumulation capacitors, numerals 106–106n and 206–206m denote switching transistors for reading the voltages accumulated in the accumulation capacitors, numerals 108 and 208 denote common output lines to which the outputs are read, numerals 109 and 209 denote stray capacitances of the common output lines 108 and 208, and numerals 110 and 210 denote shift registers for scanning bits.

Numerals 111 and 211 denote output buffers, numerals 112–112n and 212–212m denote amplifiers for real-time monitoring a maximum value of the outputs of 101–101n and 201–201m, numerals 113–113n and 213–213m denote amplifiers for real time monitoring a minimum value of the outputs of the photo-sensing transistors 101–101n and 201–201m, numerals 114 and 214 denote output buffers, numerals 115 and 215 denote differential amplifiers, A1 denotes a control block 1, A2 denotes a control block 2, numerals 115, 117, 118, 216, 217 and 218 denote resistors for supplying desired comparison reference voltages to the succeeding stage comparators, numerals 150 and 151 denote reference voltage controlling resistors for controlling the comparison reference voltages of the comparators, which function as reference voltage control means for correcting the difference between the outputs of the sensor columns, numerals 119, 120 and 121 denote comparators of the control block 1, numerals 219, 220 and 221 denote comparators of the control block 2, numerals 122 and 222 denote accumulation time control circuits which receive the outputs of the comparators to drive the accumulation time controlling switching transistors 105–105n and 205–205m, and numeral 123 denotes a reference voltage terminal for generating the comparison reference voltage of the comparator.

Numerals 124 and 224 denote photo-electric conversion sensor output terminals, numerals 125 and 225 denote accumulation time control pulse output terminals, numeral 126 denotes a sensor collector power supply terminal, numeral 127 denotes a control terminal for the switching transistors 102–102n and 202–202m, numeral 128 denotes a base reset power supply terminal, numeral 129 denotes a control terminal for the switching transistors 103–103n and 203–203m, and numeral 130 denotes an emitter reset power supply terminal.

The two sensor columns of the circuit configuration shown in FIG. 4 are formed on one chip to form a photo-electric converter.

An operation of the present invention is now explained.

The NPN transistor 101 which functions as a photo-sensing element transfers a voltage corresponding to an illumination of an object to the accumulation capacitors 104–104n and 204–204m. The photo-sensing transistors 101–101n and 201–201m form a first sensor and a second sensor which are separate photo-sensors, and the numbers n and m of the photo-sensing elements may be equal to or different from each other. The orientations of the sensor columns may be same or different.

The output control between the sensor columns is now explained. The capacitance of the stray capacity 109 of the common read line 108 of the first sensor column is represented by $C_{H1}$, the capacitance of the stray capacity of the common read line 208 of the second sensor column is represented by $C_{H2}$ and the capacitance of the accumulation capacitors 104 and 204 is represented by $C_T$. The output voltage of the photo-sensing element of the first sensor column, that is, the voltage stored in the accumulation capacitor is represented by $V_{E1}$ and the output voltage of the photo-sensing element of the second sensor column, that is, the voltage stored in the accumulation capacitor is represented by $V_{E2}$. Thus, voltages $V_{out1}$ and $V_{out2}$ at the output terminals 124 and 224 of the sensor columns are represented by $$V_{out1}=V_{E1}\cdot C_T/(C_T+C_{H1})$$

$$V_{out2}=V_{E2}\cdot C_T/(C_T+C_{H2})$$

since $V_{E1}$ and $V_{E2}$ are controlled to appropriate preset values by comparing the outputs of the real time contrast monitors 115 and 215 with the comparison reference voltages by the comparators in the control block 1 and the control block 2 shown in FIG. 4, there is a difference between $V_{out1}$ and $V_{out2}$ due to the difference between $C_{H1}$ and $C_{H2}$ if $V_{E1}=V_{E2}$. Since $C_{H1}$ and $C_{H2}$ are determined by the numbers of pixels and the wiring lengths in the respective sensor columns, it has been impossible in the prior art to perfectly match them. Accordingly, in the system in which $V_{E1}$ and $V_{E2}$ are determined by the same comparator configuration, it is not possible to make the outputs $V_{out1}$ and $V_{out2}$ equal.

In the embodiment of the present invention, the comparison reference voltages of the comparators of the control block 1 and the control block 2 are changed from each other based on $C_{H1}$ and $C_{H2}$ which are previously determined by calculation so that $V_{E1}$ and $V_{E2}$ which cause $V_{out1}=V_{out2}$ are obtained.

Specifically, a tailoring resistor 150 is added on the resistors 116–118 of the control block 1 and a reference voltage tailoring resistor 151 is added on the resistors 216–218 to set the comparison reference voltages to be applied to the comparators such that they meet the above condition.

Namely, the relation of $V_{out1}=V_{out2}$ is attained by selecting R1 and R2 to meet a relation of $$C_T R_2/(C_T+C_{H1})=C_T R_1/(C_T+C_{H2})$$

where R1 is the resistance of the reference voltage tailoring resistor 150 of the control block 1 and R2 is the resistance of the reference voltage tailoring resistor 151 of the control block 2.

Figure 5:
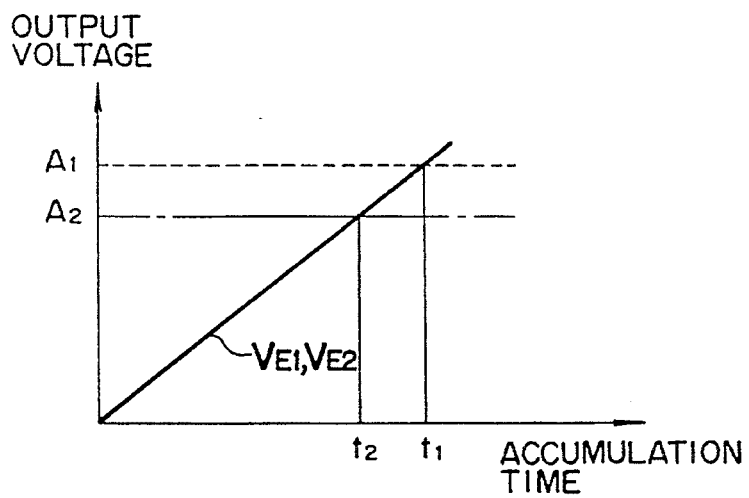
FIG. 5 illustrates control in the embodiment.
Figure 6:
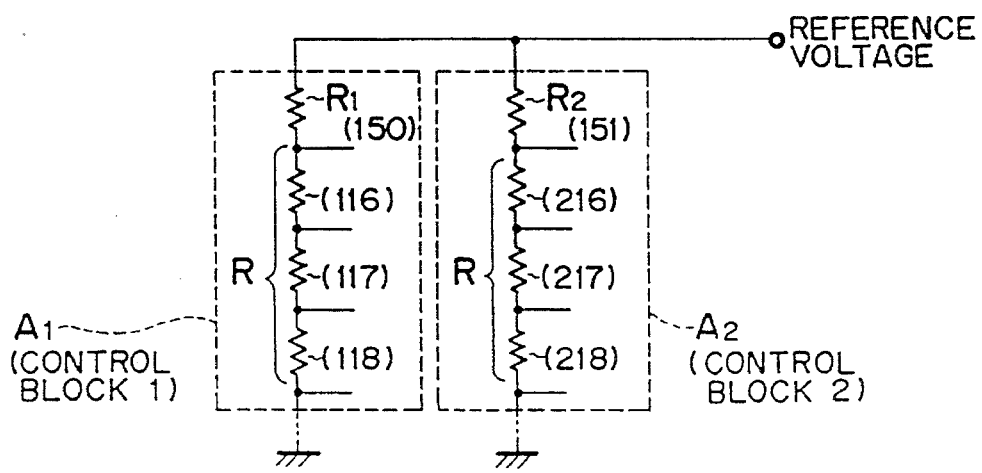
FIG. 6 illustrates control in the embodiment.

FIGS. 5 and 6 explain the control.

When $C_{H1}>C_{H2}$, $$C_T/(C_T+C_{H1})<C_T/(C_T+C_{H2})$$

is met. Thus, if $V_{E1}=V_{E2}$, then $V_{out1}<V_{out2}$. Accordingly, the reference voltage tailoring resistors of the control block 1 and the control block 2 are selected to meet a relation of R1<R2 to make the comparison reference voltages to meet a relation of A1>A2, and the accumulation times $t_1$ and $t_2$ which produce $V_{E1}$ and $V_{E2}$ to meet the relation of $V_{out1}=V_{out2}$ are selected.

In this manner, the output levels from the plurality of sensor columns are made equal.

Figure 7:
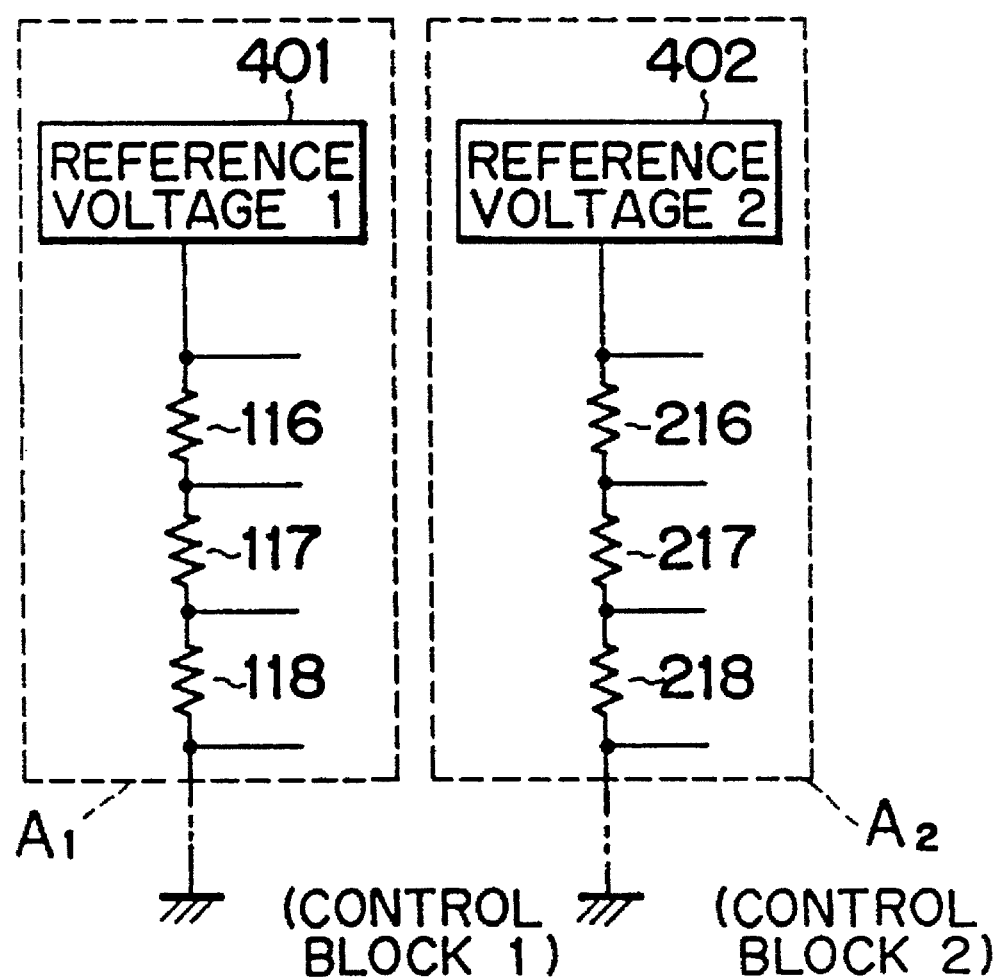
FIG. 7 shows a control block diagram of another embodiment.

FIG. 7 shows a control block diagram of another embodiment of the present invention.

The reference voltage tailoring resistors R1 and R2 in FIG. 6 are eliminated and reference voltage generators 401 and 402, a control block 1 and a control block 2 are added as the reference voltage control means so that reference voltages having adjusted for the difference between the stray capacitances $C_{H1}$ and $C_{H2}$ of the common read line is internally generated without being externally supplied. The rest of the configuration is identical to that of the previous embodiment.

The present embodiment offers the same advantages as those of the previous embodiment and eliminates the necessity for externally supplying the reference voltage.

In the present embodiment, two sensor columns are used. Where more than two sensor columns are used, the same advantages may be attained by correcting the comparison reference voltages in the same manner.

While the control blocks and the sensor columns are on the same chip in the embodiment, they may be on different chips and still attain the same advantages.

In accordance with the present embodiment, the output voltages of the photo-sensing elements of the sensor columns are discriminated by the comparators of the control blocks and applied to the accumulation time control circuit, and the accumulation time controlling switching elements are driven by the output from the accumulation time control circuit to make the output accumulation times to be correlated to the outputs of the photo-sensing elements. Thus, the present embodiment can be applied to a low contrast object.

The reference voltage control means controls the comparison reference voltages applied to the comparators of the control blocks to correct the difference between the outputs of the sensor columns. Accordingly, the photo-electric converter of the present embodiment can produce the outputs of the same level from the sensors without regard to the difference in the characteristics of the sensor columns such as the difference in the numbers of photo-sensing elements and the difference in the orientations of the sensor columns.

What is claimed is:

1. An image pickup apparatus, comprising:

a first sensor;

a first monitor signal output means for outputting a first monitor signal which corresponds to a level of an accumulated signal in said first sensor;

first control means for controlling an accumulation time of said first sensor based on said first monitor signal and a first reference level;

a second sensor;

a second monitor signal output means for outputting a second monitor signal which corresponds to a level of an accumulated signal in said second sensor; and second control means for controlling an accumulation time of said second sensor based on said second monitor signal and a second reference level different from said first reference level, and for compensating a level difference between a level of the output signal of said first sensor and a level of the output signal of said second sensor.

2. An apparatus according to claim 1, wherein said first control means includes comparing means for comparing said first monitor signal with said first reference level.

3. An apparatus according to claim 1, wherein said second control means includes comparing means for comparing said second monitor signal with said second reference level.

* * * * *

UNITED STATES PATENT AND TRADEMARK OFFICE
CERTIFICATE OF CORRECTION

PATENT NO. : 5,468,954
DATED : November 21, 1995
INVENTOR(S) : TATSUO FURUKAWA

It is certified that error appears in the above-indentified patent and that said Letters Patent is hereby corrected as shown below: Title page, col. 2, under [56] Foreign Patent Documents

"1222583" should read --1-222583--.
"1305672" should read --1-305672--.

Column 2

Line 7, "422" should read --421--.
Line 8, "accmulation" should read --accumulation--.
Line 26, "real time" should read --real-time--.
Line 35, "real time" should read --real-time--.

Column 3

Line 20, "numbers" should read --number--.

Column 4

Line 53, "real time" should read --real-time--.
Line 58, "115," should read --116,--.

UNITED STATES PATENT AND TRADEMARK OFFICE
CERTIFICATE OF CORRECTION

PATENT NO. : 5,468,954

DATED : November 21, 1995

INVENTOR(S) : TATSUO FURUKAWA

It is certified that error appears in the above-indentified patent and that said Letters Patent is hereby corrected as shown below:

<u>Column 5</u>

Line 50, "real time" should read --real-time--.

<u>Column 6</u>

Line 8, "R1 and R2" should read --$R_1$ and $R_2$--.
Line 11, "R1" should read --$R_1$--.
Line 12, "R2" should read --$R_2$--.
Line 31, "resistors R1 and R2" should read --resistors $R_1$ and $R_2$--.

Signed and Sealed this

Twenty-sixth Day of March, 1996

Attest:

BRUCE LEHMAN

*Attesting Officer*  *Commissioner of Patents and Trademarks*